US011320088B1

(12) United States Patent
Ding et al.

(10) Patent No.: US 11,320,088 B1
(45) Date of Patent: May 3, 2022

(54) DISPLAY STAND WITH HEIGHT ADJUSTMENT AND TILT ADJUSTMENT

(71) Applicants: UBTECH NORTH AMERICA RESEARCH AND DEVELOPMENT CENTER CORP, Pasadena, CA (US); UBTECH ROBOTICS CORP LTD, Shenzhen (CN)

(72) Inventors: Houzhu Ding, Pasadena, CA (US); Chengkun Zhang, Pasadena, CA (US); Huan Tan, Pasadena, CA (US); Youjun Xiong, Shenzhen (CN)

(73) Assignees: UBTECH NORTH AMERICA RESEARCH AND DEVELOPMENT CENTER CORP, Pasadena, CA (US); UBTECH ROBOTICS CORP LTD, Shenzhen (CN)

( * ) Notice: Subject to any disclaimer, the term of this patent is extended or adjusted under 35 U.S.C. 154(b) by 0 days.

(21) Appl. No.: 17/113,127

(22) Filed: Dec. 7, 2020

(51) Int. Cl.
*F16M 11/00* (2006.01)
*F16M 11/10* (2006.01)
*F16M 11/26* (2006.01)
*F16M 11/18* (2006.01)

(52) U.S. Cl.
CPC ............. *F16M 11/10* (2013.01); *F16M 11/18* (2013.01); *F16M 11/26* (2013.01)

(58) Field of Classification Search
CPC ......... F16M 11/10; F16M 11/26; F16M 11/18
See application file for complete search history.

(56) References Cited

U.S. PATENT DOCUMENTS

| 5,887,836 | A | * | 3/1999 | Back | B63C 11/18 |
| | | | | | 248/221.11 |
| 7,815,154 | B2 | * | 10/2010 | Oh | F16M 11/28 |
| | | | | | 248/176.3 |
| 7,828,255 | B2 | * | 11/2010 | Yen | F16M 11/2021 |
| | | | | | 248/162.1 |
| 8,020,821 | B2 | * | 9/2011 | Chen | G06F 1/18 |
| | | | | | 248/220.22 |
| 8,490,933 | B2 | * | 7/2013 | Papic | F16M 11/046 |
| | | | | | 248/288.11 |
| 9,038,972 | B2 | * | 5/2015 | Fu | F16M 11/10 |
| | | | | | 248/133 |
| 9,784,538 | B2 | * | 10/2017 | Sovine | F41J 1/10 |
| 9,857,020 | B2 | * | 1/2018 | Yeh | F16M 11/046 |
| 10,591,106 | B2 | * | 3/2020 | Pell | F16M 11/16 |
| 10,663,105 | B2 | * | 5/2020 | Chen | F16M 11/2014 |
| 10,927,999 | B1 | * | 2/2021 | Wojcik | F16M 11/16 |
| 11,118,729 | B2 | * | 9/2021 | Zebarjad | F16M 11/105 |

(Continued)

*Primary Examiner* — Amy J. Sterling

(57) ABSTRACT

A display stand includes a frame, an actuated rotary mechanism coupled to the frame, a counterweight coupled to the actuated rotary mechanism and movable in a vertical direction during rotation of the display about the axis of rotation, and an elevation mechanism. The actuated rotary mechanism includes a display holder that is configured to mount a display to the frame and rotate the display about an axis of rotation. The counterweight and the display are located at opposite sides of a vertical plane that passes through the axis of rotation such that a combined center of mass of the display, the display holder, and the counterweight lies on the vertical plane. The frame is coupled to the elevation mechanism, and the elevation mechanism is configured to move the frame up and down.

19 Claims, 14 Drawing Sheets

(56) References Cited

U.S. PATENT DOCUMENTS

| | | | | |
|---|---|---|---|---|
| 2002/0140875 A1* | 10/2002 | Ho | ................ | G06F 1/1601 |
| | | | | 348/839 |
| 2005/0085123 A1* | 4/2005 | Moscovitch | ........... | F16M 11/14 |
| | | | | 439/532 |
| 2007/0235601 A1* | 10/2007 | Yen | .................... | F16M 11/2014 |
| | | | | 248/122.1 |
| 2007/0252919 A1* | 11/2007 | McGreevy | ............. | F16M 11/10 |
| | | | | 348/825 |
| 2007/0262210 A1* | 11/2007 | Oh | ........................ | F16M 11/28 |
| | | | | 248/125.1 |
| 2008/0210841 A1* | 9/2008 | Tseng | .................. | F16M 11/046 |
| | | | | 248/422 |
| 2012/0024804 A1* | 2/2012 | Moscovitch | ....... | F16M 11/2014 |
| | | | | 211/26 |
| 2013/0206938 A1* | 8/2013 | Clouser | ................ | A47B 57/567 |
| | | | | 248/219.4 |
| 2015/0034780 A1* | 2/2015 | Petry | ...................... | F16M 11/28 |
| | | | | 248/160 |
| 2015/0289651 A1* | 10/2015 | Floersch | ................ | F16M 11/10 |
| | | | | 211/26 |
| 2017/0257962 A1* | 9/2017 | Huang | ................ | F16M 11/041 |
| 2019/0072229 A1* | 3/2019 | Sherman | ................ | F16M 11/16 |
| 2019/0226629 A1* | 7/2019 | Chen | ..................... | F16M 11/24 |

* cited by examiner

DISPLAY STAND WITH HEIGHT ADJUSTMENT AND TILT ADJUSTMENT

TECHNICAL FIELD

The present disclosure generally relates to display stands, and particularly to a display stand with height adjustment and tilt adjustment.

BACKGROUND

A wide variety of displays for various applications are available, such as displays used in robot industries. For example, a service robot may include a display device for presenting information to users. The display device can be a touch-sensitive display that allows the display to serve as an input device to receive input operations from users. Such service robots can be programmed to chat with users, give directions, and answer questions, which allow them to be deployed in retail stores, restaurants, shopping malls, airports, hospitals, etc.

Many service robots typically include a main body having a fixed height and a display device securely positioned on the top of the main body. The service robots are designed for scenarios where users stand in front of the service robots and use the display device by finger touches. Because of the fixed height of the main body, users of different heights may find it awkward to use the display comfortably. That is, some users may have to bend their heads down to view and operate the display, while some users sitting on a wheelchair may have to raise their heads to view and operate the display device.

Additionally, some service robots may include a tiltable display that allows users to manually rotate the display to a desired angle for a better viewing experience. However, for some first-time users, it may be difficult to discover the means of adjustment and actually adjust the display accordingly.

Therefore, there is a need to provide a display stand to overcome the above-mentioned problems.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
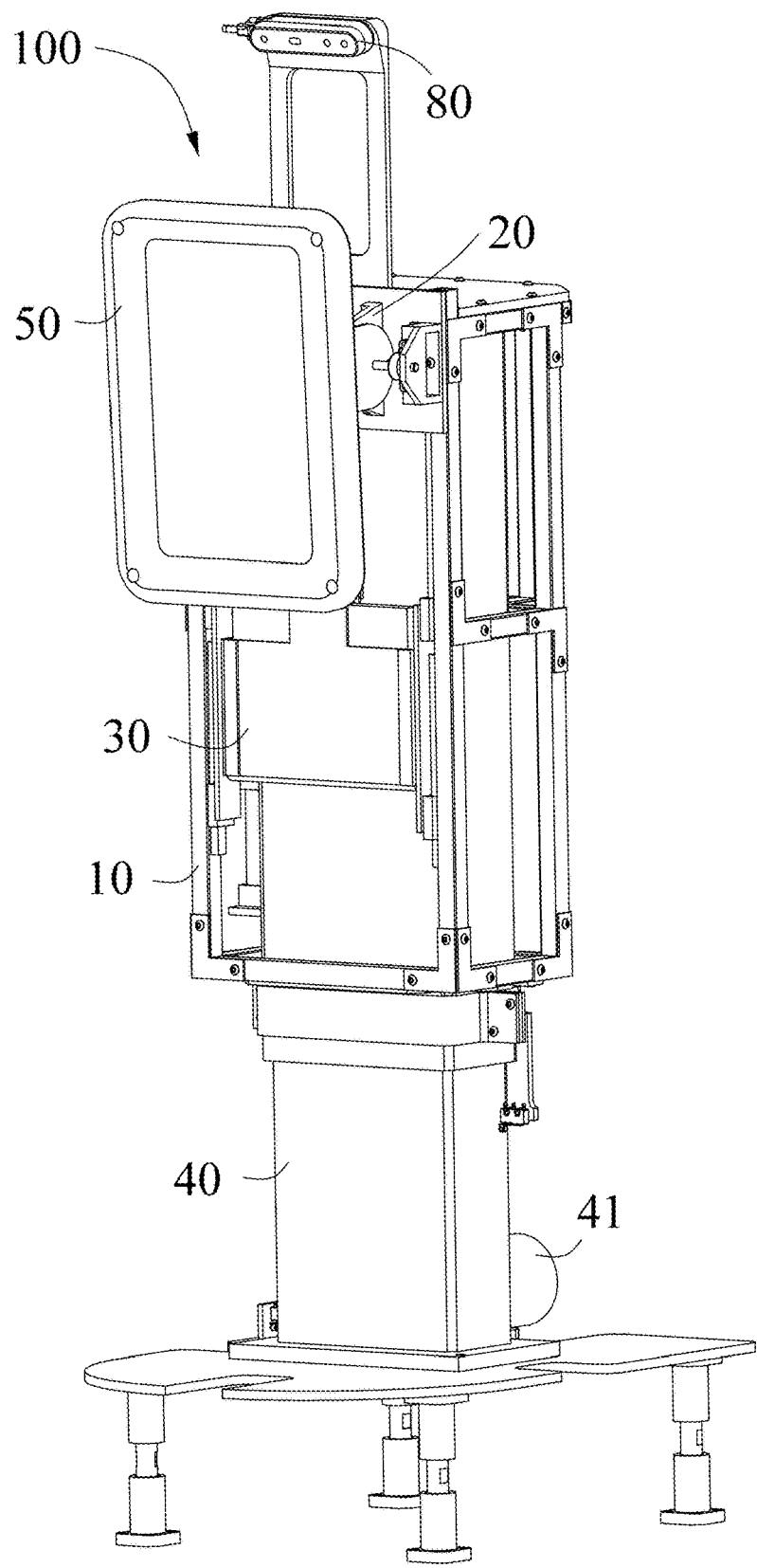
FIG. 1 is an isometric view of a display stand according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Figure 2:
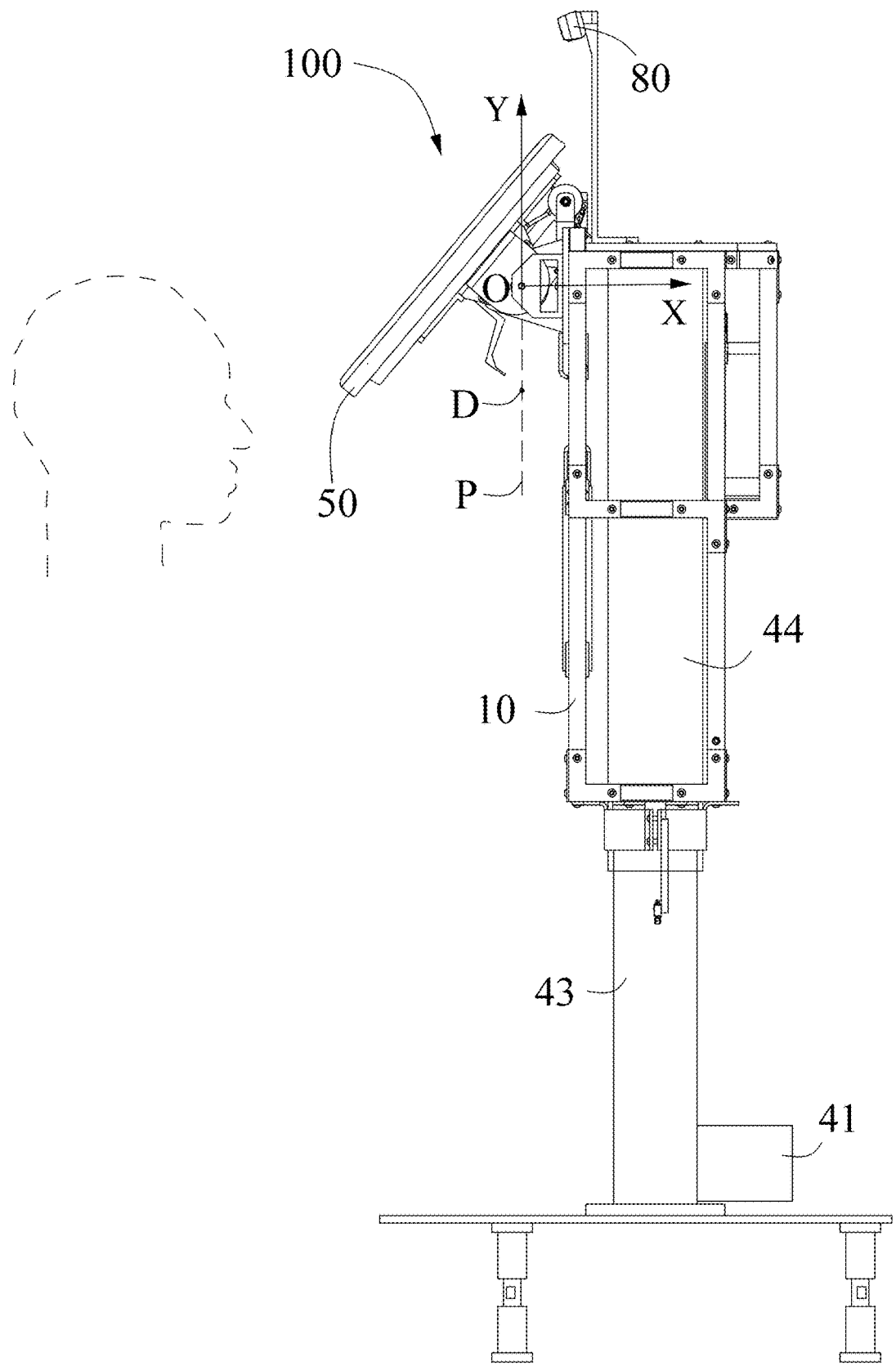
FIG. 2 is a side view of the display stand of FIG. 1.
Figure 3:
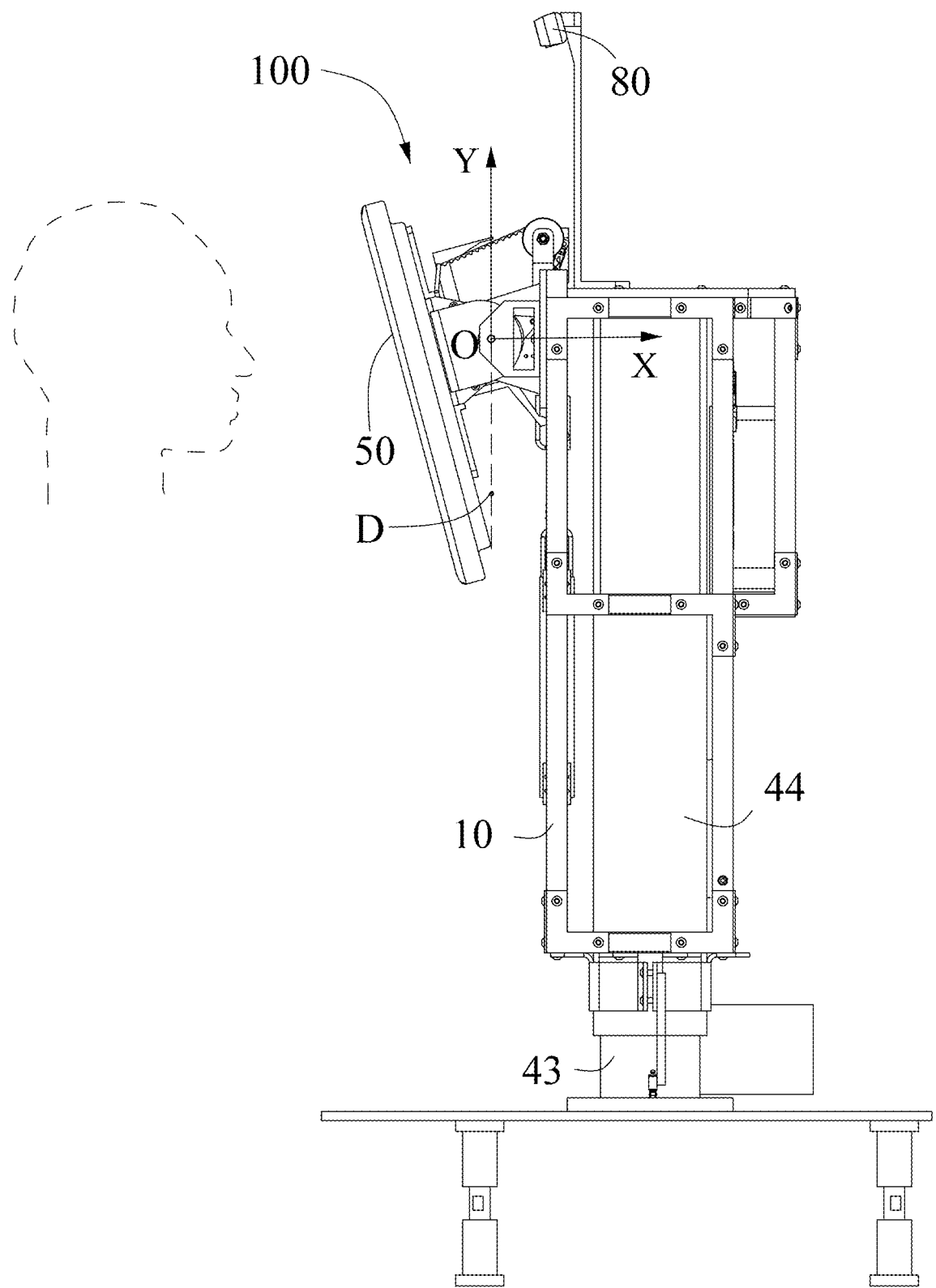
FIG. 3 is similar to FIG. 2, with a display in a different orientation and at a different height.

Display stands may be used in many different applications for supporting displays. For example, an illustrative display stand shown in FIGS. 1-3 may be used in a robot (e.g., service robot). The display stand may stand independently or be accommodated in a housing of the robot and allows for rotation and height adjustment of the display. The robot can automatically adjust the orientation and height of the display upon detecting the presence of a user facing the robot. For example, the display of FIG. 2 can be tilted down and moved down to the position as shown in FIG. 3 such that a user can have a comfortable viewing experience when the eyesight is perpendicular to the display. The robot may be a fixed-based service robot or a mobile service robot. However, the example of FIGS. 1-3 is merely an illustrative example. The display stand may be used in other applications and the robots may be used in other applications, such as in construction, telemedicine or education.

With reference to FIGS. 1-3, in one embodiment, a display stand 100 includes a frame 10, an actuated rotary mechanism 20 coupled to the frame 10, a counterweight 30 coupled to the actuated rotary mechanism 20, and an elevation mechanism 40. The actuated rotary mechanism 20 is configured to mount a display 50 (via a display holder 23, see FIG. 4) to the frame 10 and rotate the display 50 about an axis of rotation L (see FIG. 5). The counterweight 30 is movable in a vertical direction during rotation of the display 50. The counterweight 30 and the display 50 are located at opposite sides of a vertical plane P (see FIG. 5) that passes through the axis of rotation L. The counterweight 30, the display holder 23, and the display 50 are configured in such way that a combined center of mass D of the display 50, the display holder 23, and the counterweight 30 always lies on the vertical plane P. The frame 10 is coupled to the elevation mechanism 40 and the elevation mechanism 40 is configured to move the frame 10 up and down.

The frame 10 provides a direct support for the actuated rotary mechanism 20, and may provide a support for linear rails for guiding the counterweight 30 to move up and down. The frame 10, via actuation of the elevation mechanism 40, can move up or down to a determined position such that the display 50 can be moved to a desired height. The actuated rotary mechanism 20 connects the display 50 to the frame 10, and can rotate (tilt) the display 50 up or down to a determined position according to command instructions. The actuated rotary mechanism 20 may include a rotary damper to control speed of rotation of the display 50 and hold the display 50 in position when operating on the display. The counterweight 30 may slide up and down with respect to the frame 10. The upper end of the counterweight 30 may be coupled to the actuated rotary mechanism 20, which causes the counterweight 30 to move upward when the display 50 is rotated down, and causes the counterweight 30 to move downward when the display 50 is rotated up. The elevation mechanism provides a movement mechanism to drive the frame 10 to move in a vertical direction such that the display 50 can be moved to a desired height.

Figure 4:
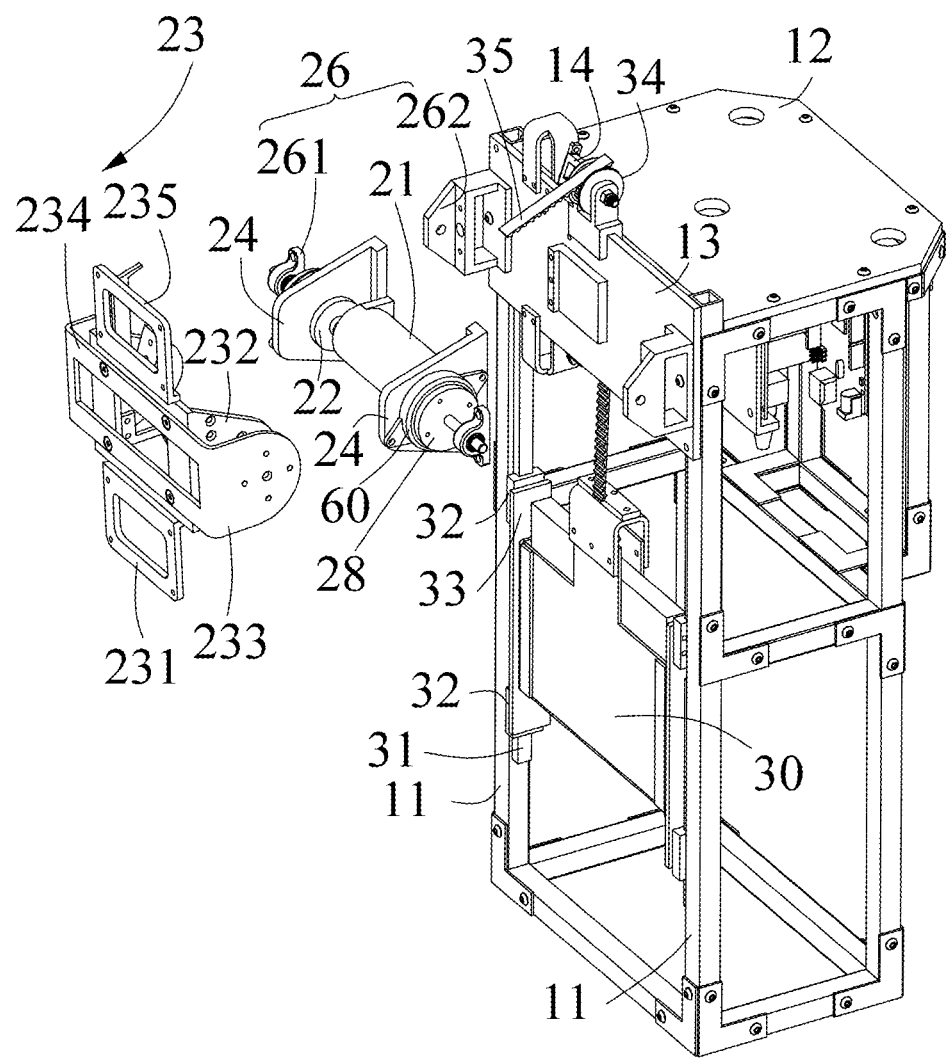
FIG. 4 is an isometric exploded view of the display stand, with certain components omitted.
Figure 5:
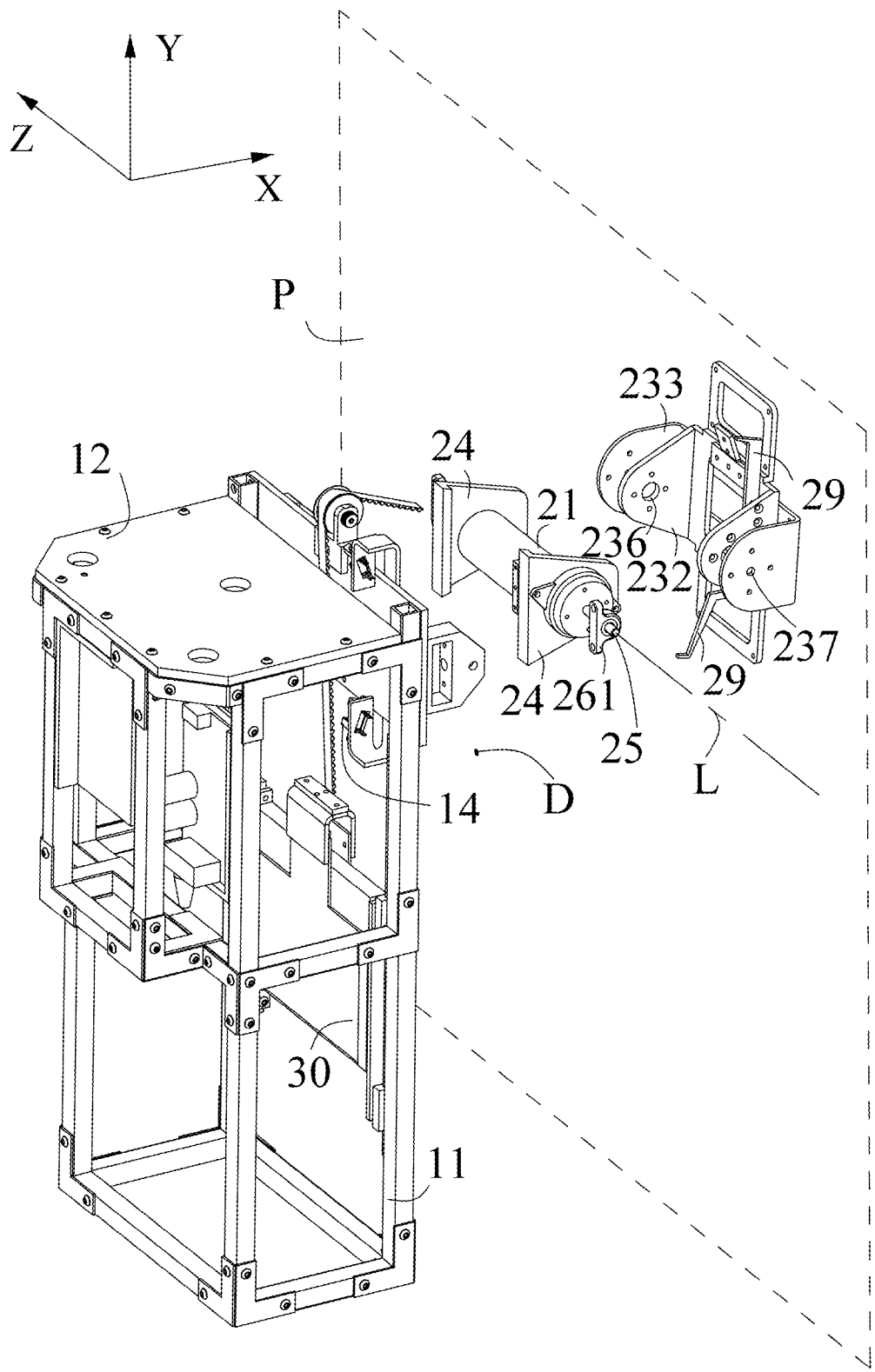
FIG. 5 is an isometric exploded view of the display stand viewed from a different perspective.

With reference to FIGS. 4 and 5, in one embodiment, the frame 10 may include two vertical bars 11 that are fixed to each other. The bars 11 are substantially parallel to each other, and extend in a vertical direction (e.g., a direction as indicated by the y axis of FIG. 5). The frame 10 may be fixed to the elevation mechanism 40 through a top plate 12 fixed to the back sides of the vertical bars 11. The frame 10 may further include a fixing plate 13 fixed to the front sides of the bars 11. The fixing plate 13 may be a flat plate and the actuated rotary mechanism 20 is fixed to the fixing plate 13.

The actuated rotary mechanism 20 includes a motor 21 coupled to the frame 10 and the display holder 23 rotatably coupled to the frame 10. The display 50 is coupled to the display holder 23. The motor 21 is configured to actuate the display holder 23 to rotate about the axis of rotation L. Specifically, the motor 21 may be fixed to the fixing plate 13 by fasteners (e.g., screws). The motor 21 may be disposed horizontally such that an output shaft 211 (see FIG. 6) of the motor 21 extends in a horizontal direction (e.g., a direction as indicated by the z axis of FIG. 5). The output shaft 211 is rotatable about the axis of rotation L.

In one embodiment, the display holder 23 may include a display mounting plate 231 and a pair of first side plates 232. The display 50 is mounted to the display mounting plate 231. The display mounting plate 231 may be a single component or include two or more components that are fixed to one another. In the embodiment, the display mounting plate 231 includes two plates 234 and 235 that extend in the horizontal direction and in the vertical direction. In this way, the display 50 can be vertically fixed to the vertical plate 235 as shown in FIG. 1, or can be horizontally fixed to the horizontal plate 234. The first side plates 232 protrude from opposite ends of the vertical plate 235 and extend away from the display 50. The first side plates 232 are substantially parallel to each other and located at opposite ends of the motor 21. The output shaft 211 is fixed to the first side plate 232 facing the output shaft 211 through a connection member 22 (see FIGS. 6 and 7). Specifically, the connection member 22 may include a main body 221 and a protrusion 222. One side surface of the main body 221 is fixed to the first side plate 232 facing the output shaft 211, and the protrusion 222 protrudes from an opposite side of the main body 221. The protrusion 222 may define a receiving hole (not shown) to securely receive one end of the output shaft 211.

In one embodiment, the actuated rotary mechanism 20 may further include two support walls 24 protruding from the fixing plate 13. The support walls 24 are spaced apart from each other to provide sufficient space to receive the motor 21 and the first side plates 232. The actuated rotary mechanism 20 may further two shafts 25 and two shaft mounting members 26. One end of each shaft 25 is coupled to one shaft mounting member 26. Specifically, each shaft mounting member 26 may include a shaft end receiver 261 (e.g., a mounted bearing) and a mounting block 262 fixed to the fixing plate 13. One end of each shaft 25 is coupled to the shaft end receiver 261 and the shaft end receiver 261 is fixed to an associated mounting block 262. The two shafts 25 penetrate the two support walls 24 and can rotate relative to the two support walls 24. In this way, each shaft 25 is supported by one associated shaft mounting member 26 and one associated support wall 24.

Figure 7:
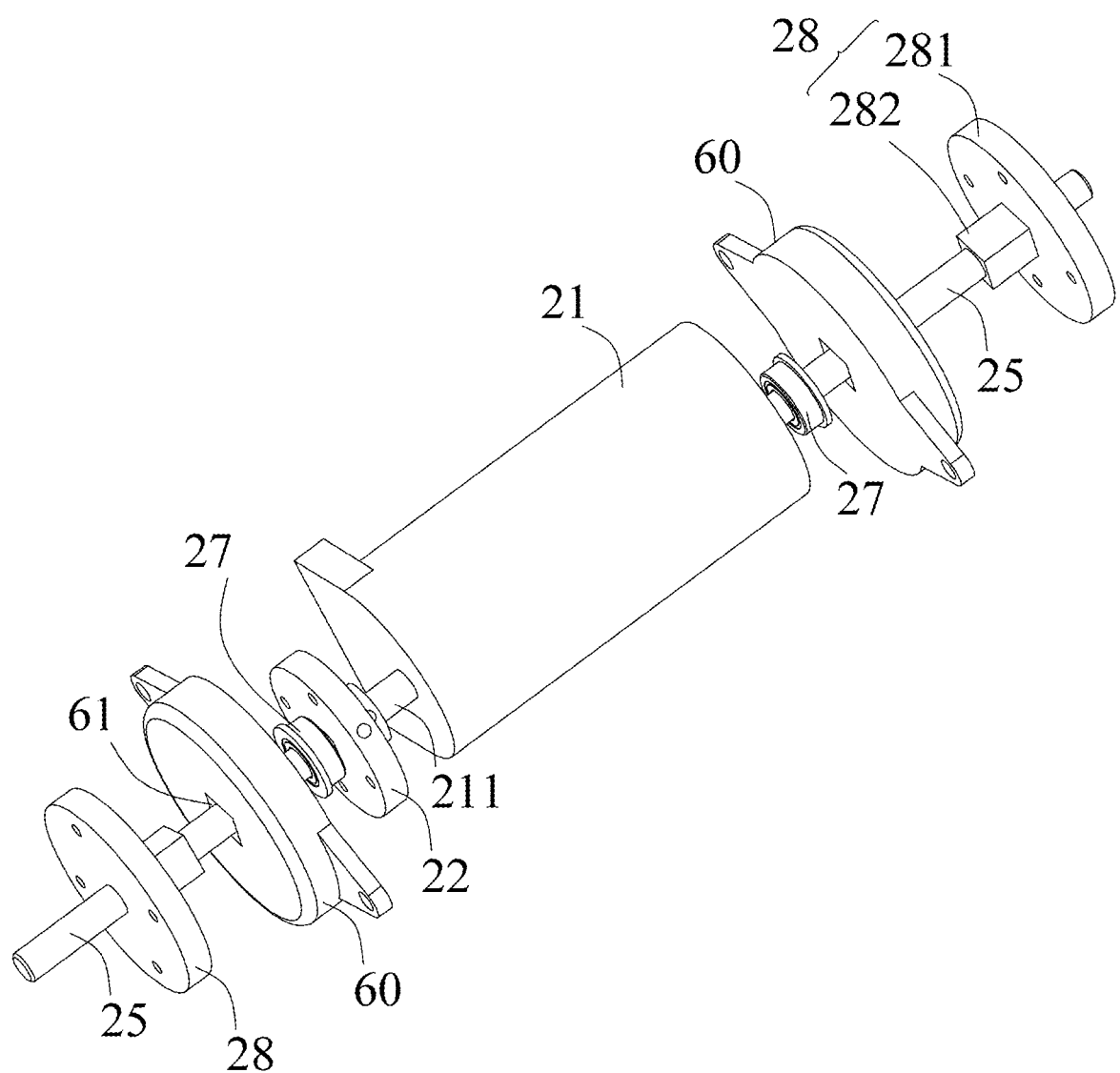
FIG. 7 is an isometric exploded view of an assembly including a motor, rotary dampers, and transmitting members of the display stand.

In one embodiment, the actuated rotary mechanism 20 may further include two bearings 27 (see FIG. 7). Each first side plate 232 may define a bearing hole 236 (see FIG. 5). The inner ring of each bearing 27 is arranged around the end of one associated shaft 25, and the outer ring of each bearing 27 is fit in the bearing hole 236 of one associated first side plate 232. The display holder 23 is thus rotatably coupled to the frame 10, and can rotate together with the output shaft 211 of the motor 21.

Figure 6:
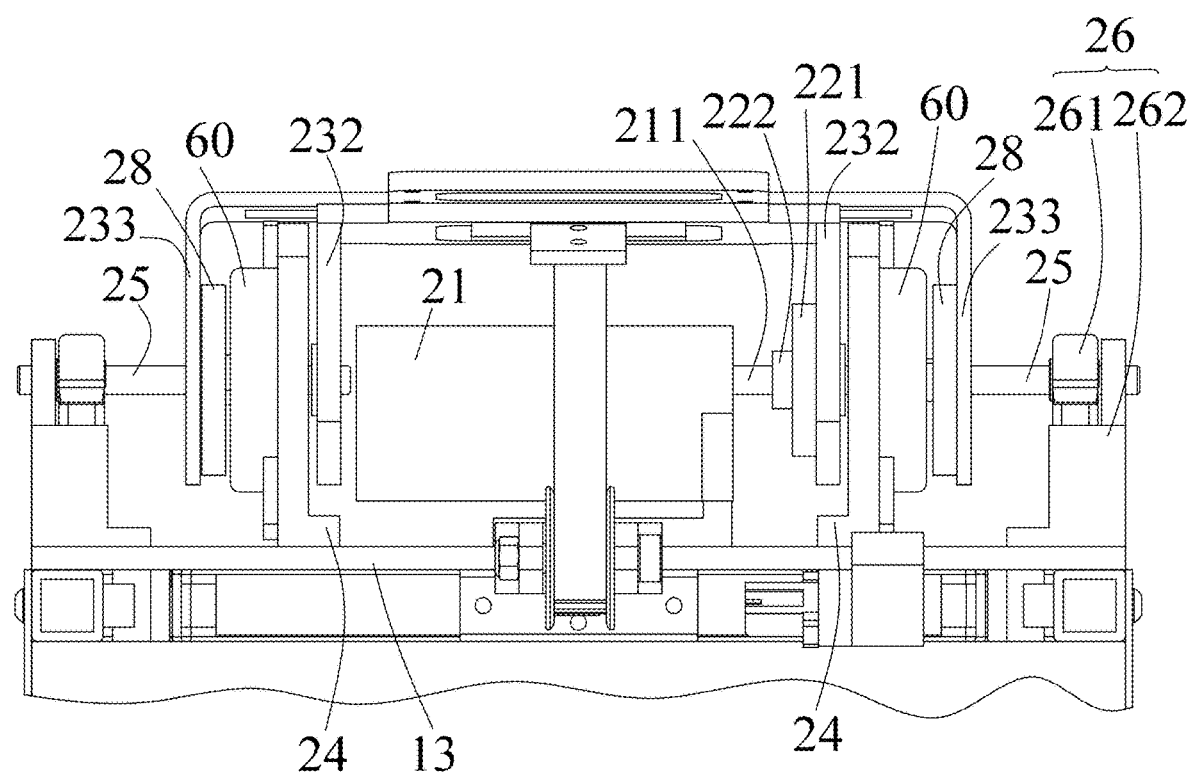
FIG. 6 is a partial top view of the display stand.

With reference to FIG. 6, in one embodiment, the display stand 100 may include one or two rotary dampers 60 coupled to the display holder 23. The rotary dampers 60 are configured to control speed of rotation of the display holder 23. The following descriptions are made on the case where two rotary dampers 60 are used. In the example, the display holder 23 may include two second side plates 233 that protrude from opposite ends of the horizontal plate 234. Each second side plate 233 is located at an outer side of one associated support wall 24 opposite one associated first side plate 232. Each rotary damper 60 is fixed to the outer side of one associated support wall 24 opposite one associated first side plate 232. The actuated rotary mechanism 20 may further include two transmitting members 28 for transmitting rotary motion of the display holder 23 to the rotary dampers 60. Specifically, each transmitting member 28 may include a main body 281 fixed to the inner side of one associated second side plate 233, and a shaft portion 282 protruding from the main body 281. Each transmitting member 28 may define a through hole passing through the main body 281 and the shaft portion 282. Each rotary damper 60 defines a through hole 61. Each shaft 25 passes through a through hole 237 (see FIG. 5) in one associated second side plate 233, the through hole of one associated transmitting member 28, and the through hole 61 of one associated rotary damper 60, and passes through one associated support wall 24.

With reference to FIG. 7, in the embodiment, the through hole 61 is defined in a rotor of each rotary damper 60, and has a square cross section. The shaft portion 282 of each transmitting member 28 is sized and shaped according to the through hole 61. Each shaft portion 282 is able to be fit into the through hole 61 of one associated rotary damper 60. When the transmitting members 28 rotate together with the second side plates 233, the rotors of the rotary dampers 60 is thus driven to rotate. Various types of dampers are available. For example, the rotary dampers 60 may utilize the principle of fluid resistance to dampen movement. In this example, each rotary damper 60 may include a main body, the rotor, a cap, and oil filled in the space defined by the main body, the rotor and the cap. The viscosity of the oil is used to provide the braking force to slow down the rotary motion of the display holder 23, which can ensure smooth and gentle rotation of the display 50. It should be noted that the dampers 60 of FIG. 7 are merely illustrative examples and other types of dampers may be used for speed control of the display 50 according to actual needs.

With referenced to FIGS. 4 and 5 again, the display stand 100 may further include two vertical linear rails 31 coupled to the frame 10 and two or more sliders 32 coupled to the counterweight 30. The sliders 32 are respectively coupled to and slidable along the two linear rails 31. The following descriptions are made on the case where four sliders 32 are used. In the example, each linear rail 31 is fixed to and extend along one associated bar 11. The counterweight 30 may be a weighted block that is disposed between the two bars 11, and the four sliders 32 may be indirectly fixed to opposite ends of the counterweight 30 through a connection bar 33. The counterweight 30, in one example, may be a rectangular block and has a width less than a horizontal distance between the two bars 11. However, the counterweight 30 can be formed in other shapes according to actual needs, for example in the shape of a circle. The counterweight 30 may be disposed below the display 50. The counterweight 30 may be slidably coupled to the two bars 11 and slidable along the two bars 11. Specifically, one side of each connection bar 33 is fixed to one associated end of the counterweight 30, and two sliders 32 are fixed to an opposite side of each connection bar 33. Which such an arrangement, the counterweight 30 can only slide up and down along the linear rails 31. It should be noted that the number of the sliders 32 can change according to actual needs. If two sliders 32 are used, the two sliders may be directly fixed to opposite ends of the counterweight 30, and the connection bars 33 may be omitted in this case. The mass and the position of the counterweight 30 relative to the axis of rotation L need to satisfy a predetermined requirement which will be described in detail later.

In one embodiment, the counterweight 30 may be coupled to the actuated rotary mechanism 20 by a belt (cable). Specifically, a pulley 34 may be positioned on the top of the fixing plate 13, and a belt 35 is wrapped around the pulley 34 and has opposite ends that are respectively attached to the actuated rotary mechanism 20 and the counterweight 30. When display 50 is rotated down, the counterweight 30 is pulled by the belt 35 to move upward, and when the display 50 is rotated up, the counterweight 30 is pulled to move downward by its weight. The counterweight 30 can apply a pulling force to the display 50 transferred through the display holder 23. The pulling force can generate a torque that counteract the torque generated by the weight of the display 50 and the display holder 23. Thus, no side effect is applied to the output shaft 211 of the motor 21. In the embodiment, the belt 35 is a timing belt, and the pulley 34 is a timing belt pulley. That is, the pulley 34 and the belt 35 have multiple teeth that are engaged with one another.

In one embodiment, the display holder 23, the counterweight 30, and the display 50 are configured in such a way that a combined center of mass D (see FIGS. 1 and 2) of a system including the display holder 23, the counterweight 20, and the display 50 lies on the vertical plane P that passes through the axis of rotation L (see FIG. 5). Since the combined center of mass D lies on the plane P that passes through the axis of rotation L, the net torque applied to the display 50 around the axis of rotation L due to the weight of the system including the display holder 23, the counterweight 20, and the display 50 is approximately zero when the display 50 is parallel to the vertical plane P, which can avoid the side load effect on the motor 21. with reference to FIGS. 1 and 2 again, in a coordinate system whose origin O lies on the axis of rotation L, the x-coordinate of the combined center of mass D is equal to 0 when the combined center of mass D lies on the plane P. The x-coordinate of the combined center of mass D can be expressed as: $x=(m1*x1+m2*x2+m3*x3)/(m1+m2+m3)$, where x represents the x-coordinate of the combined center of mass D, m1 represents the mass of the display holder 23, x1 represents the x-coordinate of the center of mass of the display holder 23, m2 represents the mass of the counterweight 30, x2 represents the x-coordinate of the center of mass of the counterweight 30, m3 represents the mass of the display 50, x3 represents the x-coordinate of the center of mass of the display 50. Accordingly, the mass and the position of the display holder 23, the counter weight 30 and the display 50 can be determined according to the following equation: $m1*x1+m2*x2+m3*x3=0$.

With reference to FIGS. 4 and 5 again, in one embodiment, the display stand 100 further includes two limit switches 14 coupled to the frame 10. The two limit switches 14 are configured to be activated by the actuated rotary mechanism 20 when the display 50 has rotated to predetermined positions. Specifically, the two limit switches 14 may be fixed to the upper end and the lower end of the fixing plate 13. The display holder 23 may further include two pins 29 that are fixed to the inner side of the plate 235 of the display holder 23. The two pins 29 move together with the display holder 23 and can trigger the two limit switches 14, respectively. When one of the limit switches 14 is triggered, rotation of the output shaft 211 of the motor 21 is stopped. The limit switches 14 can be mechanical type limit switches, optical limit switches, etc.

Figure 8:
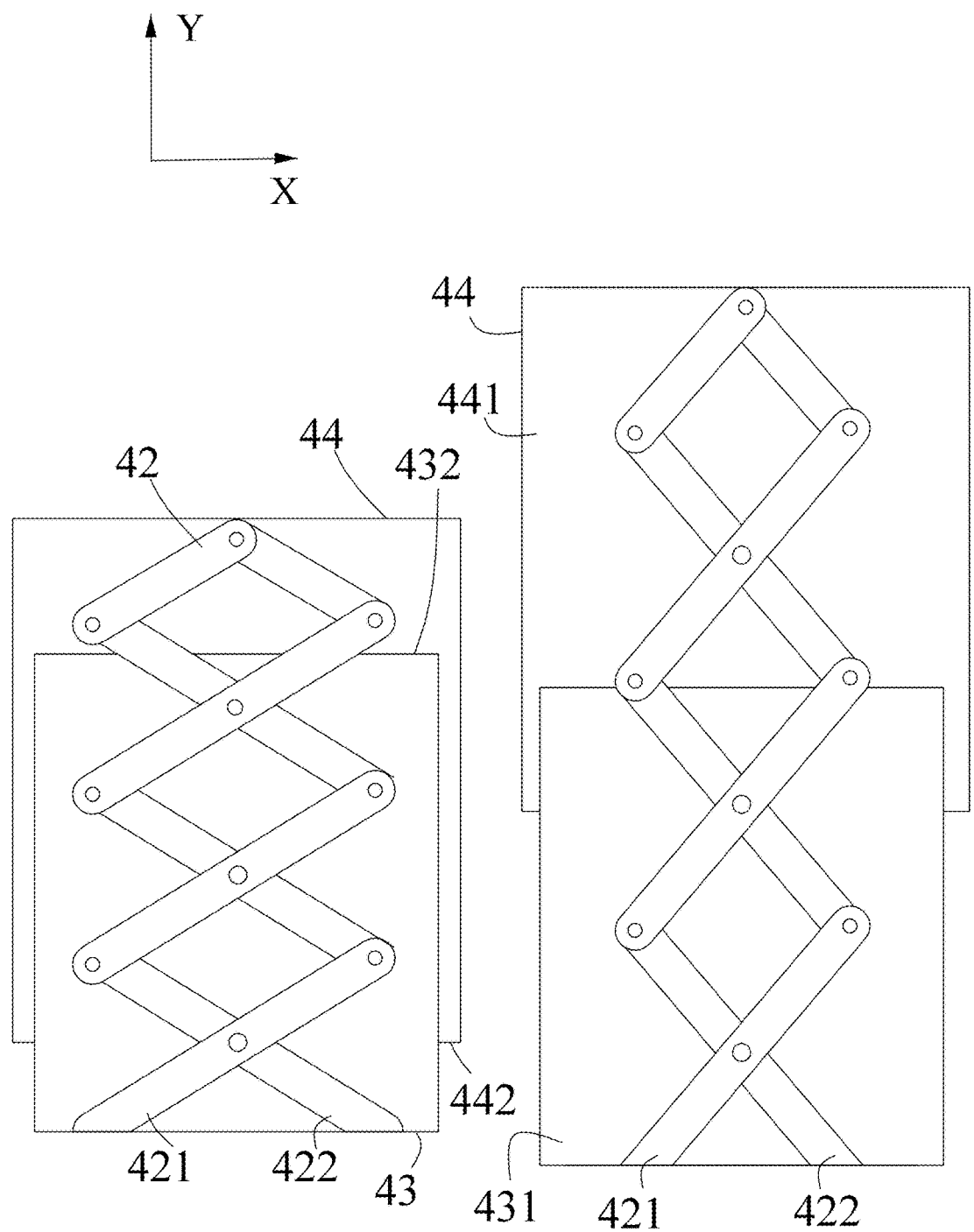
FIG. 8 is a schematic diagram showing principle of an elevation mechanism of the display stand.

With reference to FIGS. 1, 2 and 8, in one embodiment, the elevation mechanism 40 includes an actuator 41 and a lifting mechanism 42. The frame 10 is coupled to the lifting mechanism 42, and the actuator 41 is configured to drive the lifting mechanism 42 to elongate or retract in the vertical direction. The actuator 41 may be a linear actuator configured to apply a pushing force or a pulling force to the lifting mechanism 42 to drive the lifting mechanism 42 to elongate or retract in the vertical direction. In one embodiment, the lifting mechanism 42 may include a lead screw that is coupled to the output shaft of the actuator 41, and a threaded collar that is coupled to and slidable along the lead screw. By engagement of the threaded collar with the lead screw, rotary motion from the actuator 41 is converted into translational motion. The elevation mechanism 40 can then drive the frame 10 to move up and down. In another embodiment, the lifting mechanism 42 may be a scissor lift mechanism. Specifically, the lifting mechanism 42 includes one or more pairs of supports 421 and 422 that are rotatably connected to one another and each pair of supports 421 and 422 form a crisscross "X" pattern. The arrangement of these pairs of supports 421 and 422 is well known and will not be described in detail here. It should be noted that the lead screw and threaded collar, and the scissor lift mechanism are just examples of the lifting mechanism 42. The lifting mechanism 42 may be of other configurations according to actual needs.

The elevation mechanism 40 further includes a lower housing 43 and an upper housing 44. The lower housing 44 may be fixed to a base where the actuator 41 may be mounted. The frame 10 may be fixed to the upper housing 44. For example, the top plate 12 of the frame 10 can be fixed to the upper end of the upper housing 44. Both of the lower housing 43 and the upper housing 44 are hollow. The lower housing 43 defines a chamber 431 having an upper open end 432, and the upper housing 44 defines a chamber 441 having a lower open end 442. The lower housing 43 is slidably received in the chamber 441. A lower portion of the lifting mechanism 42 is received in the chamber 431 of the lower housing 43, and the lowermost pair of supports 421 and 422 is slidably coupled to the bottom of the chamber 431. An upper portion of the lifting mechanism 42 is received in the chamber 441 of the upper housing 44, and the uppermost pair of supports 421 and 422 is fixed to the inner surface of the upper end of the upper housing 44. When one of the lowermost pair of supports 421 and 422 is pushed by the actuator 41, the supports 421 and 422 of the lowermost pair rotate with respect to each other and the upper ends of the supports 421 and 422 move toward each other, which cause the lifting mechanism 42 to elongate in the vertical direction. The upper housing 44 is then driven to move up in the vertical direction (i.e., a direction indicated by the y axis of FIG. 8), causing the frame 10 to move up. When one of the lowermost pair of supports 421 and 422 is pulled by the actuator 41, the supports 421 and 422 of the lowermost pair rotate with respect to each other and the upper ends of the supports 421 and 422 move away from each other, which cause the lifting mechanism 42 to retract in the vertical direction. The upper housing 44 is then driven to move down, causing the frame 10 to move down.

Figure 9:
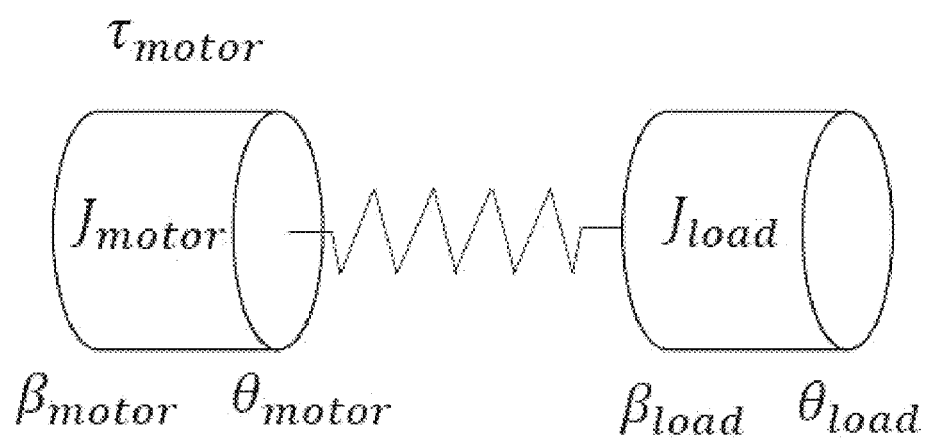
FIG. 9 is a schematic diagram showing a model of a motor driving a load.

In one embodiment, the motor 21 may be direct current (DC) motor. FIG. 9 shows a simple model of the motor 21 driving a load including the display holder 23, the counterweight 30, and the display 50. The parameters of the model include $J_{motor}$ representing the rotational inertia of the motor 21, $J_{load}$ representing the rotational inertia of the load, $\beta_{motor}$ representing the damping ratio of the motor 21, $\beta_{load}$ representing the damping ratio of the load, $\theta_{motor}$ representing the rotational speed of the motor 21, $\theta_{load}$ representing the rotational speed of the load, and $\tau_{motor}$ representing the input torque of the motor 21. The input torque of the motor 21 equals to the torque generated by a spring representing the elastic characteristic of the model, the inertia of the motor 21, and the damping of the motor 21. That is, the input torque of the motor 21 can be expressed as: $\tau_{motor} = k(\theta_{motor} - \theta_{load}) + J_{motor}\ddot{\theta}_{motor} + \beta_{motor}\dot{\theta}_{motor}$. When the load is rotating, the torque is balanced by having: $k(\theta_{load} - \theta_{motor}) = J_{load}\ddot{\theta}_{load} - \beta_{load}\dot{\theta}_{load}$. In the two equations, k is a constant. Let $\theta_{load} = x_1$, $\dot{\theta}_{load} = x_2$, $\theta_{motor} = x_3$, and $\dot{\theta}_{motor} = x_4$, the state equation of the model can be written as:

$$\dot{x}_1 = x_2;\ \dot{x}_2 = -\frac{k}{J_{load}}x_1 - \frac{\beta_{load}}{J_{load}}x_2 + \frac{k}{J_{load}}x_3;$$

$$\dot{x}_4 = \frac{k}{J_{motor}}x_1 - \frac{\beta_{motor}}{J_{motor}}x_4 - \frac{k}{J_{motor}}x_3 + \frac{1}{J_{motor}}\tau_{motor}.$$

That is, the model in the state space form can be expressed as:

$$\dot{X} = AX + B\tau$$
$$y = CX$$

where $$A = \begin{vmatrix} 0 & 1 & 0 & 0 \\ -\frac{k}{J_{load}} & -\frac{\beta_{load}}{J_{load}} & \frac{k}{J_{load}} & 0 \\ 0 & 0 & 0 & 1 \\ \frac{k}{J_{motor}} & 0 & -\frac{k}{J_{motor}} & -\frac{\beta_{motor}}{J_{motor}} \end{vmatrix},$$

$$B = \begin{vmatrix} 0 \\ 0 \\ 0 \\ \frac{1}{J_{motor}} \end{vmatrix}, C = [1\ 0\ 0\ 0],$$

$X = [x_1\ x_2\ x_3\ x_4], \tau = \tau_{motor}, y = \tau_{load}.$

The general solution of the state equation is expressed as follows: $x(t-t_0) = e^{A(t-t_0)}$, where t represents time, and $t_0$ is constant representing a start time.

Figure 10:
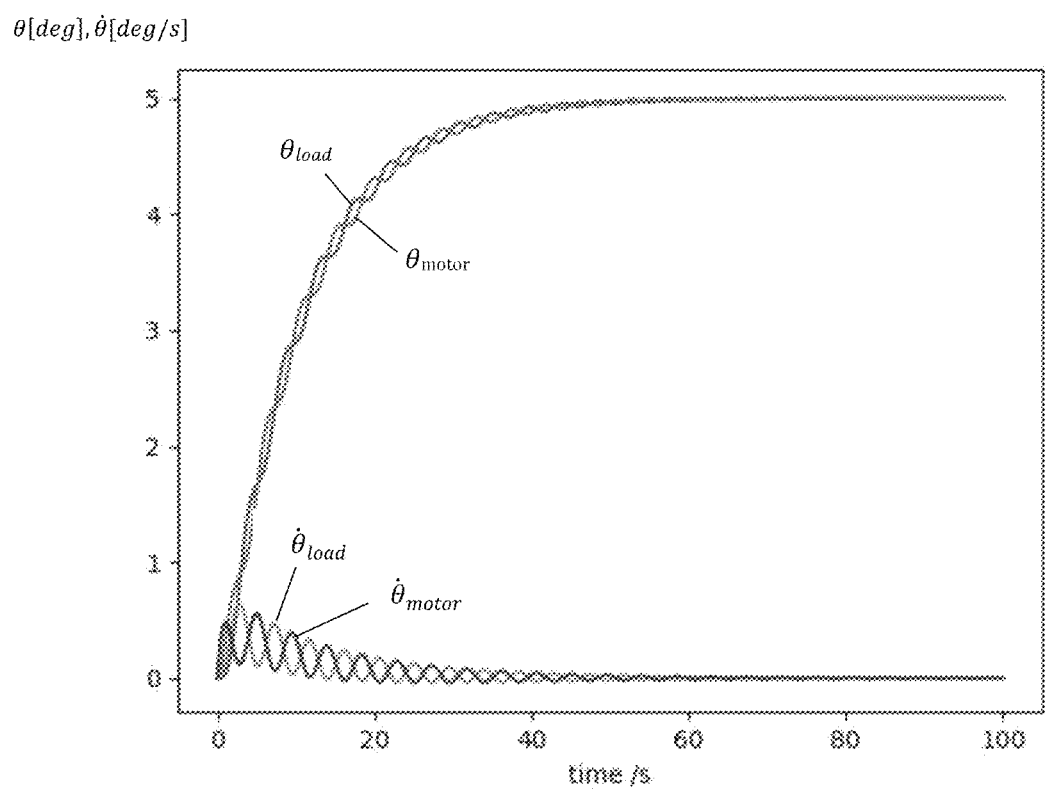
FIG. 10 is a schematic diagram showing a simulation result of angular position and speed of the motor and a display holder of the display stand.

The angular position and speed of both the motor 21 and the display holder 23 can be calculated according to the equations above. Simulated data showing the dynamic response when the motor 21 is input with a constant torque can be obtained when the parameters $J_{motor}$, $J_{load}$, $\beta_{motor}$, $\beta_{load}$, and k associated with A are given. For example, FIG. 10 shows the simulation result when $J_{motor}=1$ kg·m², $J_{load}=1$ kg·m², $\beta_{motor}=0.1$N, $\beta_{load}=0.1$N, and k=1N/rad. The simulation can help in validation of importance the counterweight balance design, which change the inertia of the load ($J_{load}$) and the overall damping/spring parameter used in the equation. In addition, the simulation can also facilitate the design of a better motor controller to smooth the rotational motion of the display.

Figure 11:
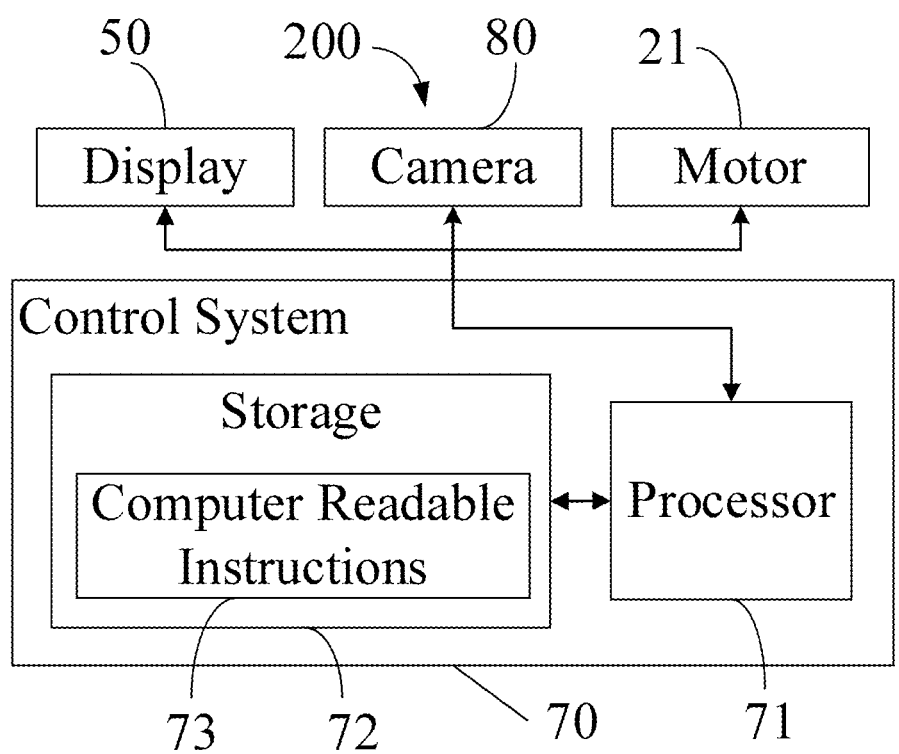
FIG. 11 is a schematic block diagram of a robot according to one embodiment.

FIG. 11 shows robot 200 that is equipped with the display stand 100. The robot 200 may include a control system 70 that includes a processor 71 and a storage 72 that stores computer readable instructions 73. The processor 71 runs or executes various software programs and/or sets of instructions stored in storage 72 to perform various functions for the robot 200 and to process data. The processor 71 may be a central processing unit (CPU), a general purpose processor, a digital signal processor (DSP), an application specific integrated circuit (ASIC), a field-programmable gate array (FPGA), a programmable logic device, a discrete gate, a transistor logic device, a discrete hardware component, or a combination of some of or all of these components. The general purpose processor may be a microprocessor or any conventional processor or the like. The storage 72 may store software programs and/or sets of computer readable instructions and may include high-speed random access memory and may include non-volatile memory, such as one or more magnetic disk storage devices, flash memory devices, or other non-volatile solid-state memory devices.

In one embodiment, the robot 200 may further include a camera 80 that may be mounted on the frame 10 above the display 50. The motor 21, the display 50 and the camera 80 are electrically coupled to the processor 71, which allows the processor 71 to send signals to and received signals from the motor 21, the display 50 and the camera 80. The processor 71 can then control the motor 21, the display 50 and the camera 80. For example, the processor 71 may control the motor 21 to drive the display holder 23 to rotate the axis of rotation L. The camera 80 is configured to capture images/videos of real-world environment surrounding the robot 200. The processor 71 may adjust the height and orientation of the display 50 based on the images/videos. It should be note that the robot 200 may further include additional input units (e.g., microphone, infrared receiver, etc.) to receive an input from a user and may adjust the height and orientation of the display 50 in response to commands (e.g., voice commands) from the additional input units.

In one embodiment, the robot 200 may be a wheeled robot and is movable on a support surface (e.g., floor, ground, etc.). The robot 200 may have a human face detecting and tracking capability. After a human face is detected, the robot 20 can be controlled to spin on the spot about a vertical axis to directly face the human face. For example, after an image captured by the camera 80 contains a human face, the processor 71 may determine the coordinates of the center point of the human face, and compare the coordinates of the center point of the human face with the coordinates of the center point of the image. The processor 71 then controls the robot 200 to spin on the spot until the center point of the human face lies on, right above, or right under the center point of the image captured by the camera 80, causing the robot 200 to face the human face, which allows a user to view the display 50 (see FIGS. 2 and 3 for such a scenario). It should be noted that various human face detecting/tracking technologies have been proposed and other human face detecting/tracking technologies may be used such that the processor 71 is able to control the robot 200 to face a detected user.

Figure 12:
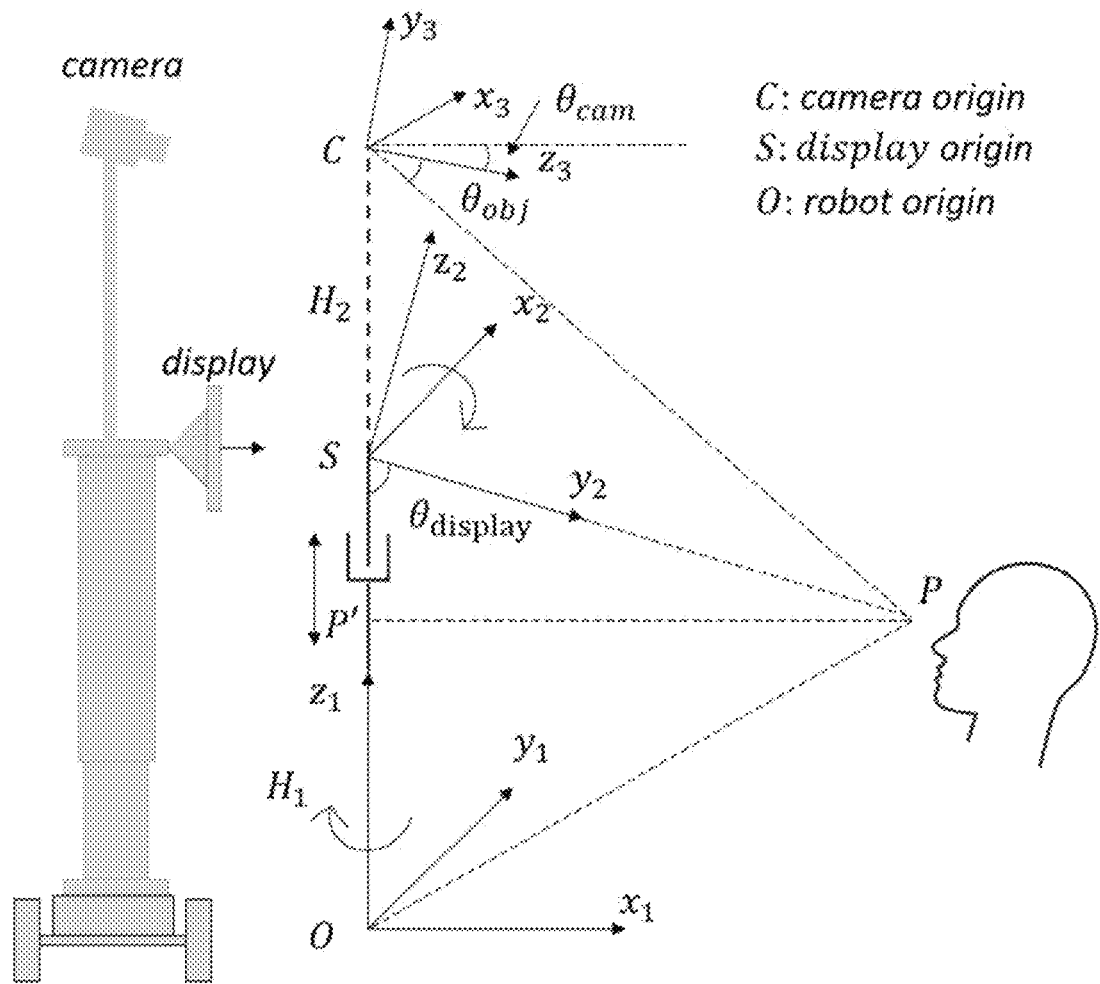
FIG. 12 is a schematic diagram showing a model for calculating parameters associated with adjustment of the display of the display stand.

FIG. 12 is a schematic diagram showing the robot 200 facing a human face. To simplify calculation, three coordinate systems associated with the robot 200, the display 50 and the camera 80 are created with their origins lying on the same vertical line. Specifically, a coordinate system $x_1 y_1 z_1$ associated with the robot 200 has an origin O that is located on the support surface (e.g., floor) where the robot 200 stands, and the x-axis and y-axis of the coordinate system $x_1 y_1 z_1$ are horizontal and vertical. A coordinate system $x_2 y_2 z_2$ associated with the display 50 has an origin S that is located above the origin O, and y-axis of the coordinate system $x_2 y_2 z_2$ is perpendicular to the display surface of the display 50. A coordinate system $x_3 y_3 z_3$ associated with the camera 80 as an origin C that is located above the origin S, and the z-axis of the coordinate system $x_3 y_3 z_3$ passes through the center of the lens of the camera 80 and is perpendicular to the lens of the camera 80. That is, the z axis of the coordinate system $x_3 y_3 z_3$ lies on the optical axis of the camera 80. The plane defined by the x-axis and z-axis of the coordinate system $x_1 y_1 z_1$, the plane defined by the y-axis and z-axis of the coordinate system $x_2 y_2 z_2$, and the plane defined by the y-axis and z-axis of the coordinate system $x_3 y_3 z_3$ are coincident.

As shown in FIG. 12, an angle $\theta_{obj}$ between line CP and z-axis of the coordinate system $x_3 y_3 z_3$ can be evaluated, where point P may represent a key point on the human face. For example, the key point may be the center between eyes, the center of the mouth, nose tip, and the like. The angle $\theta_{obj}$ can be also referred to as pitch angle of the human face. In the embodiment, the angle $\theta_{obj}$ can be expressed as:

$$\theta_{obj} = \arcsin\left(\frac{y_{obj}}{l_{CP}}\right),$$

where $y_{obj}$ represents the perpendicular distance from the point P to the z-axis of the coordinate system $x_3 y_3 z_3$, and $l_{CP}$ represents the distance between the point P and the origin C. The distance $l_{CP}$ can be evaluated based on the following equation: $l_{CP} = l_{known} * l_{imgknown} / l_{imgcp}$, where $l_{known}$ is a constant representing the distance between the point P and the origin C when the point P is in a previous position, $l_{imgknown}$ is a constant representing the height of the human face in an image captured when the point P is in the previous position, and $l_{imgcp}$ represents the height of the human face in an image captured when the point P is in the current position as shown in FIG. 12. The distance $l_{known}$ and the height $l_{imgknown}$ can be measured when the point P is in the previous position and pre-stored in the storage 72. Similarly, the perpendicular distance $y_{obj}$ can be evaluated based on the following equation: $y_{obj} = k * y_{imgobj}$, where k is a constant, and $y_{imgobj}$ represents the vertical distance between the counterpart point of the point P in the image and the center of the image.

After the pitch angle $\theta_{obj}$ of the human face is determined, the camera 80 and the display 50 can be moved up or down by the elevation mechanism 40 to decrease the pitch angle $\theta_{obj}$ of the human face. In the embodiment, the camera 80 and the display 50 are configured in such a way that a human face at a determined horizontal distance from the robot 200 may be at a height the same as the height of display 50 when the pitch angle $\theta_{obj}$ is equal to about zero. That is, after the pitch angle $\theta_{obj}$ of the human face is decreased to about zero, the human face may face the display 50. However, if the human face is not at the determined horizontal distance from the robot 200, the height of the display 50 may be not satisfactory when the pitch angle $\theta_{obj}$ of the human face is decreased to about zero. In this case, the robot 200 can control the display 50 according to a command (e.g., voice command) from the user to be moved to a desired position (e.g., a position at the same height as the user).

As shown in FIG. 12, $l_{pp'}$ is the shortest distance between the human face to the robot 200, and can be determined according to the following equation: $l_{pp'} = l_{CP} \sin(\pi/2 - \theta_{cam} - \theta_{obj})$, where $l_{cp}$ represents the distance between the point P and the origin C, $\theta_{cam}$ represents a pitch angle of the camera 80, and $\theta_{obj}$ represents the pitch angle of the human face. In the embodiment, the camera 80 is fixed to the frame and thus the $\theta_{cam}$ is a constant. $l_{sp}$ is the distance between the display 50 and the human face and can be determined according to the following equation: $l_{SP'} = l_{CP} \cos(\pi/2 - \theta_{cam} - \theta_{obj}) - H_2$, where $H_2$ represents the distance between the display 50 and the camera 80. A pitch angle $\theta_{display}$ of the display 50 can be determined according to the following equation:

$$\theta_{display} = \arctan\left(\frac{l'_{PP}}{l'_{SP}}\right).$$

Figure 13:
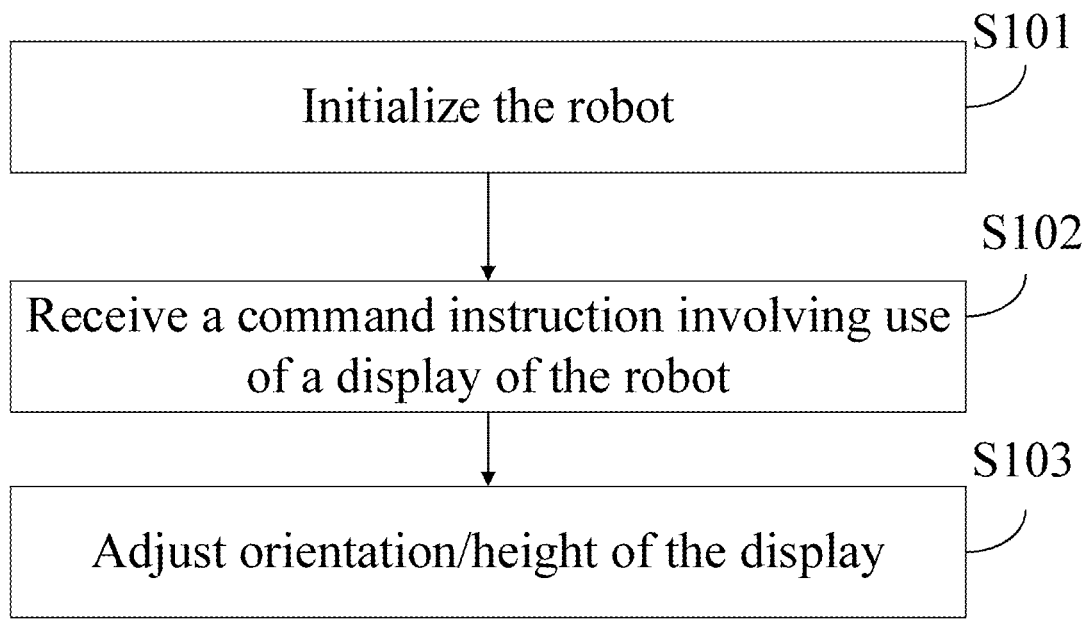
FIG. 13 is a schematic flowchart of a method for controlling the robot according to one embodiment.
Figure 14:
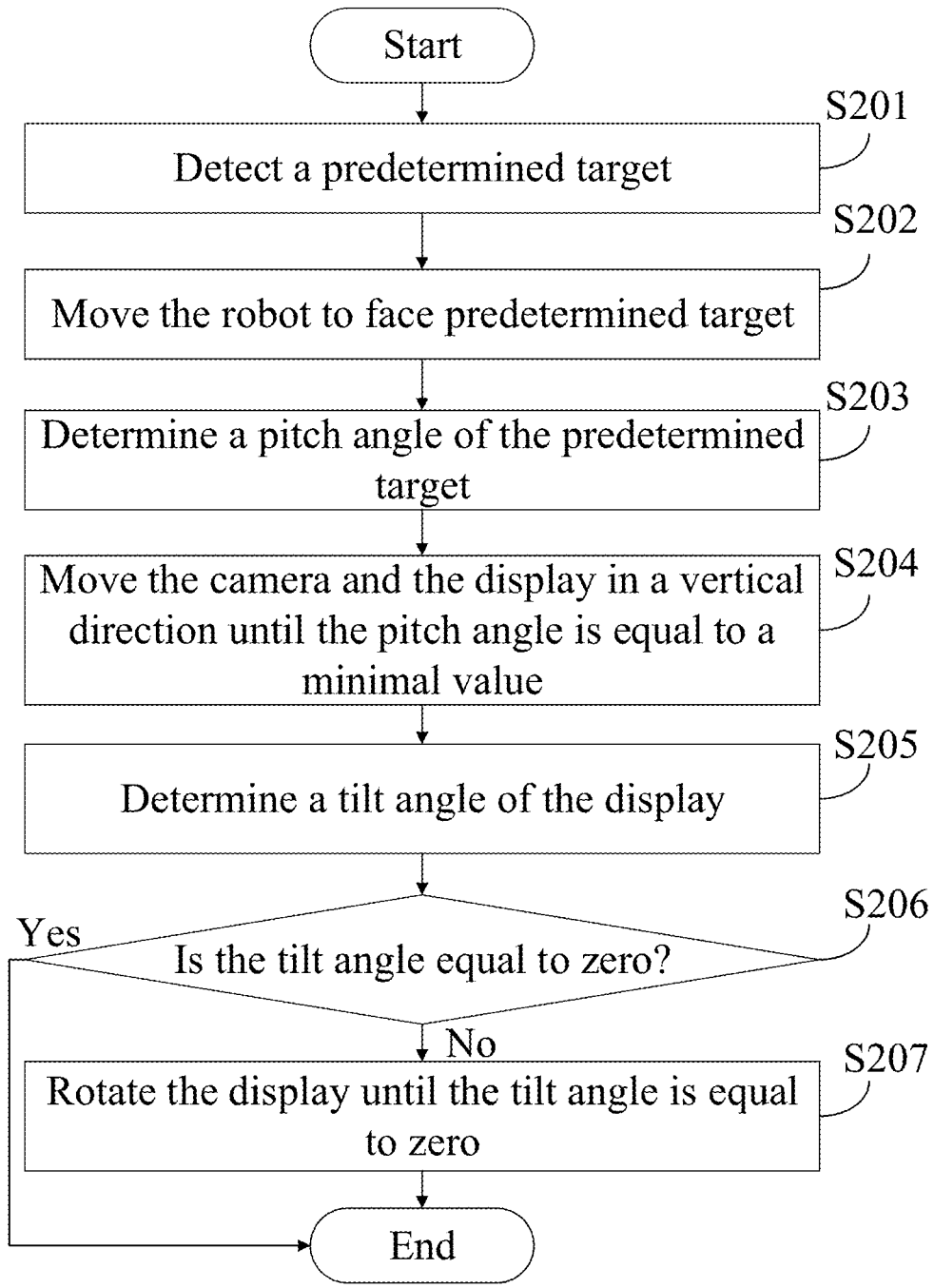
FIG. 14 is a schematic flowchart of a method for adjustment of the display of the display stand.

FIG. 13 shows a flowchart of a method for controlling the robot 200 that includes the following steps.

Step S101: Initialize the robot 200. After the robot is powered on, an initialization is performed. Initialization is how the robot 200 boots and loads. The initialization process prepares the hardware for an operating system of the robot 200 to take control. In this initialization processing, necessary programs and data are loaded. After a proper initialization, the robot 200 is in a ready-to-operate state.

Step S102: Receive a command instruction involving use of the display 50 of the robot 200. The processor 71 of the robot 200 may receive multiple command instructions during operation. For example, the processor 71 may receive a remote control or voice command instruction from a user that directs the robot 200 to move to a desired location. Some of these command instructions may involve use of the display. For example, a user may send a command instruction to initiate a conference call which require displaying of videos of multiple parties on the display 50.

Step S103: Adjust the orientation and/or height of the display 50. In the scenario when a user uses the robot 200 as a telepresence robot that enables video chat and video-conferencing, among other purposes, a user may choose to sit on a chair during the video chat and videoconferencing. In this case, the robot 200 may change the orientation/height of the display 50 for a previous purpose to adapt to the user sitting on the chair during the video chat and videoconferencing. The display 50 will be adjusted to be at a height the same as the height of the head of the user sitting on the chair. The display 50 may be adjusted to a substantially vertical orientation, giving the user a comfortable viewing experience.

In one embodiment, the step S103 may further include the following steps.

Step S201: Detect a predetermined target. In one embodiment, the predetermined target is a human face.

Step S202: Move the robot 200 to face predetermined target. In one embodiment, the robot 200 facing a human face is shown in FIGS. 2 and 3. Control of the robot 200 to face a human face has been discussed elsewhere herein. However, it should be noted that other conventional face detecting/tracking technologies may be used to move the robot 200 to face a human face.

Step S203: Determine a pitch angle of the predetermined target. In one embodiment, the pitch angle of the predetermined target herein refers to the pitch angle $\theta_{obj}$ of the human face discussed earlier, for example in the discussion of FIG. 12.

Step S204: Move the camera 80 and the display 50 in a vertical direction until the pitch angle is equal to a minimal value. In one embodiment, the minimal value is equal to zero. As discussed earlier, after the pitch angle $\theta_{obj}$ of the human face is decreased to about zero, the human face at a predetermined horizontal distance from the robot 200 may face the display 50. However, if the human face is not at the determined horizontal distance from the robot 200, the height of the display 50 may be not satisfactory when the pitch angle $\theta_{obj}$ of the human face is decreased to about zero. In this case, the robot 200 can control the display 50 according to a command (e.g., voice command) from the user to be moved to a desired position (e.g., a position at the same height as the user).

Step S205: Determine a tilt angle of the display 50. In one embodiment, the tilt angel $\alpha_{tilt}$ can be determined according to the following equation: $\alpha_{tilt}=90°-\theta_{display}$, where $\theta_{display}$ represents the pitch angle of the display 50 that has been discussed earlier, for example in the discussion of FIG. 12.

Step S206: The processor 71 determines if the tilt angle is equal to about zero. If so, the process ends; otherwise, the process goes to step S207. The tilt angle being equal to about zero means that the display 50 is in a vertical orientation.

Step S207: Rotate the display 50 until the tilt angle is equal to about zero. When the tilt angle is equal to zero, the display 50 is changed to a vertical orientation, which can give the user a comfortable viewing experience.

It should be appreciated the disclosure above detailed several embodiments of the display stand 100. As mentioned above, the robotic assistant 100 can be employed in a mobile robot that allows for video chat and videoconferencing, among other purposes. However, the disclosure is not limited thereto. In other exemplary usage scenarios, the display stand 100 may be used in a fixed-based robot for retail stores, restaurants, shopping malls, airports, hospitals, etc.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A display stand, comprising:
a frame;
an actuated rotary mechanism coupled to the frame, the actuated rotary mechanism comprising a display holder that is configured to mount a display to the frame and rotate the display about an axis of rotation;
a counterweight coupled to the actuated rotary mechanism and movable in a vertical direction during rotation of the display about the axis of rotation, the counterweight and the display being located at opposite sides of a vertical plane that passes through the axis of rotation such that a combined center of mass of the display, the display holder, and the counterweight lies on the vertical plane, wherein the counterweight is movable upward due to a pulling force generated when the display is rotated down, and movable downward due to a weight of the counterweight when the display is rotated up; and
an elevation mechanism, wherein the frame is coupled to the elevation mechanism, and the elevation mechanism is configured to move the frame up and down.

2. The display stand of claim 1, further comprising a pulley positioned on the frame and a belt, wherein the belt is wrapped around the pulley and comprises opposite ends that are respectively coupled to the actuated rotary mechanism and the counterweight.

3. The display stand of claim 2, wherein the belt is a timing belt, and the pulley is a timing belt pulley.

4. The display stand of claim 1, wherein the actuated rotary mechanism comprises a motor coupled to the frame, the display holder is rotatably coupled to the frame, the display is coupled to the display holder, and the motor is configured to actuate the display holder to rotate about the axis of rotation.

5. The display stand of claim 1, further comprising a rotary damper coupled to the display holder, wherein the rotary damper is configured to control speed of rotation of the display holder.

6. The display stand of claim 1, further comprising two vertical linear rails coupled to the frame and two sliders coupled to the counterweight, wherein the two sliders are respectively coupled to and slidable along the two linear rails.

7. The display stand of claim 1, further comprising two limit switches coupled to the frame, where the two limit switches are configured to be activated by the actuated rotary mechanism when the display has rotated to predetermined positions.

8. The display stand of claim 1, wherein the elevation mechanism comprises an actuator and a lifting mechanism, the frame is coupled to the lifting mechanism, and the actuator is configured to drive the lifting mechanism to elongate or retract in the vertical direction.

9. The display stand of claim 8, wherein the actuator is a linear actuator configured to apply a pushing force or a pulling force to the lifting mechanism to drive the lifting mechanism to elongate or retract in the vertical direction.

10. A display stand, comprising:
   a frame;
   an actuated rotary mechanism coupled to the frame, the actuated rotary mechanism comprising a display holder that is configured to provide a rotating motion so as to enable a display mounted to the actuated rotary mechanism to rotate about an axis of rotation;
   a counterweight coupled to the actuated rotary mechanism and movable in a vertical direction during rotation of the display, the counterweight and the display being located at opposite sides of a vertical plane, the counterweight configured to apply a pulling force on the display to generate a torque around the axis of rotation to counteract a torque applied to the display around the axis of rotation due to weight of the display and the display holder, wherein the counterweight is movable upward due to a pulling force generated when the display is rotated down, and movable downward due to a weight of the counterweight when the display is rotated up;
   an elevation mechanism, wherein the frame is coupled to the elevation mechanism, and the elevation mechanism is configured to move the frame up and down; and
   a control system that receives command instructions, wherein in response to the command instructions, the control system is configured to rotate the display and actuate the elevation mechanism to move the frame up and down.

11. The display stand of claim 10, further comprising a pulley positioned on the frame and a belt, wherein the belt is wrapped around the pulley and comprises opposite ends that are respectively coupled to the actuated rotary mechanism and the counterweight.

12. The display stand of claim 11, wherein the belt is a timing belt, and the pulley is a timing belt pulley.

13. The display stand of claim 10, wherein the actuated rotary mechanism comprises a motor coupled to the frame, the display holder is rotatably coupled to the frame, the display is coupled to the display holder, and the motor is configured to actuate the display holder to rotate about the axis of rotation.

14. The display stand of claim 10, further comprising a rotary damper coupled to the display holder, wherein the rotary damper is configured to control speed of rotation of the display holder.

15. The display stand of claim 10, further comprising two vertical linear rails coupled to the frame and two sliders coupled to the counterweight, wherein the two sliders are respectively coupled to and slidable along the two linear rails.

16. The display stand of claim 10, further comprising two limit switches coupled to the frame, where the two limit switches are configured to be activated by the actuated rotary mechanism when the display has rotated to predetermined positions.

17. The display stand of claim 10, wherein the elevation mechanism comprises an actuator and a lifting mechanism, the frame is coupled to the lifting mechanism, and the actuator is configured to drive the lifting mechanism to elongate or retract in the vertical direction.

18. The display stand of claim 17, wherein the actuator is a linear actuator configured to apply a pushing force or a pulling force to the lifting mechanism to drive the lifting mechanism to elongate or retract in the vertical direction.

19. The display stand of claim 10, further comprising a camera electrically coupled to the control system, wherein the control system is configured to rotate the display and actuate the elevation mechanism to move the frame up and down in response to input received from the camera.

* * * * *